J. WOLFF.
TALKING MACHINE.
APPLICATION FILED SEPT. 1, 1915.

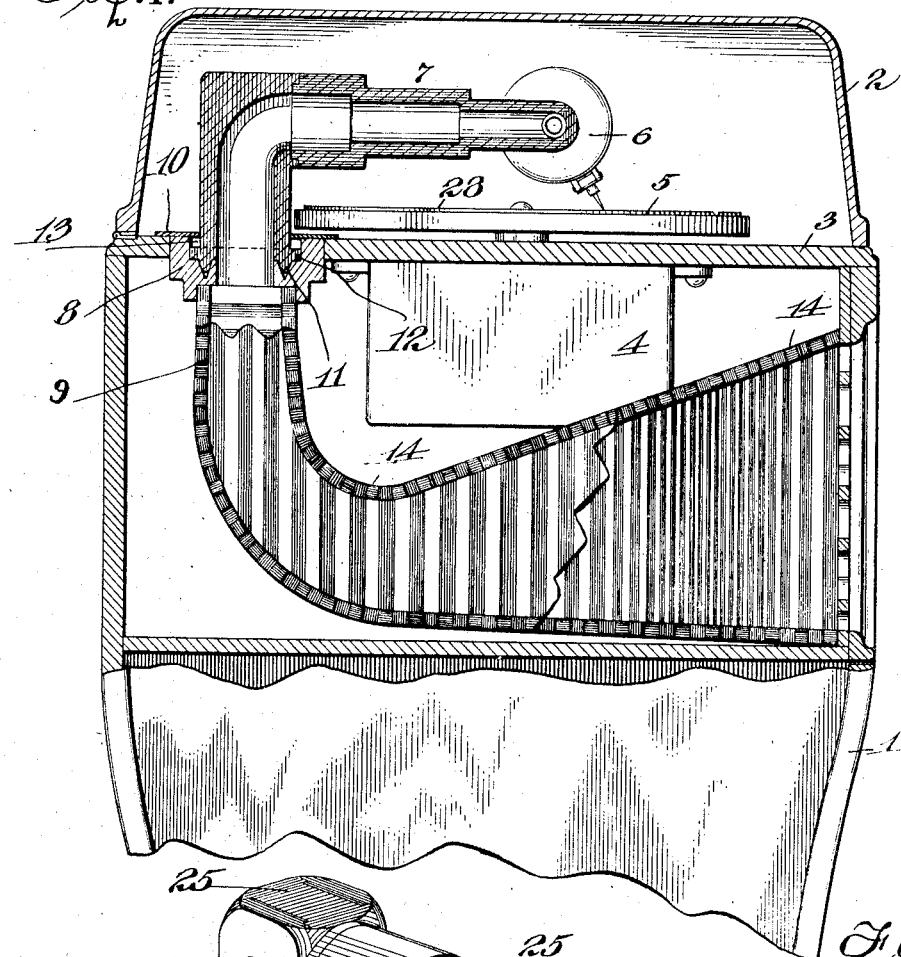
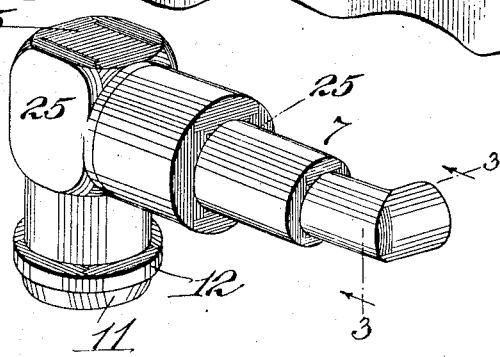
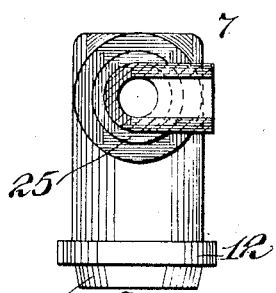

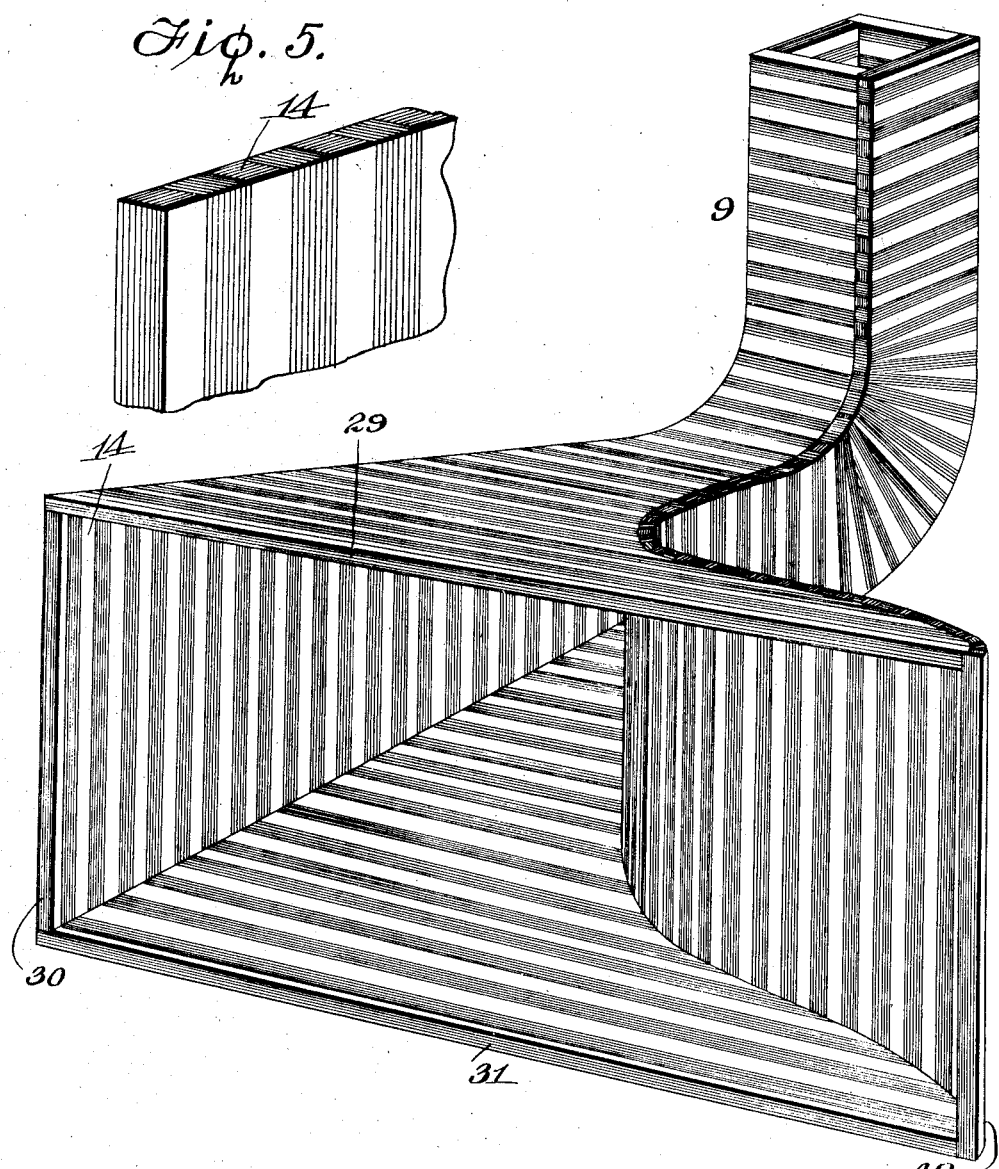

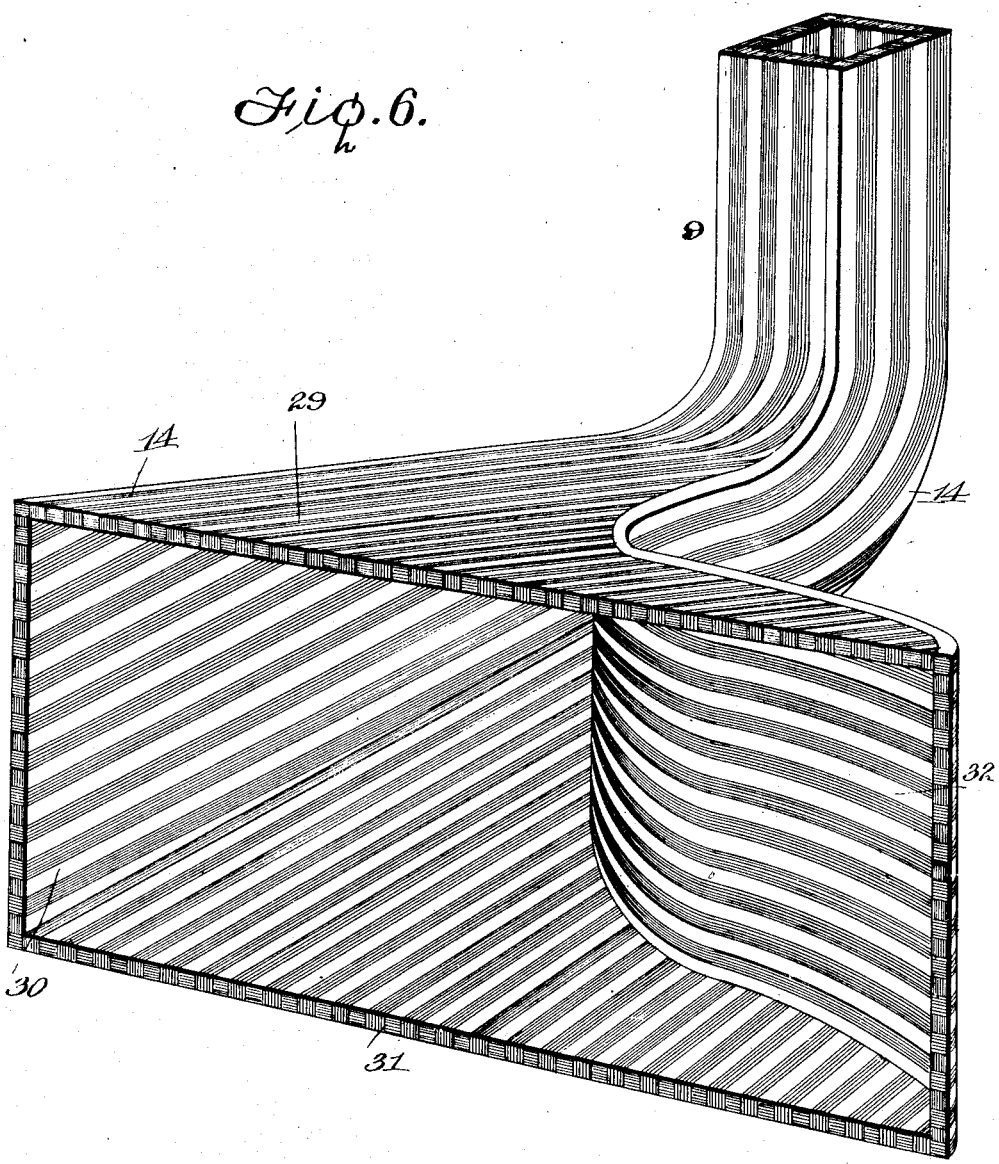

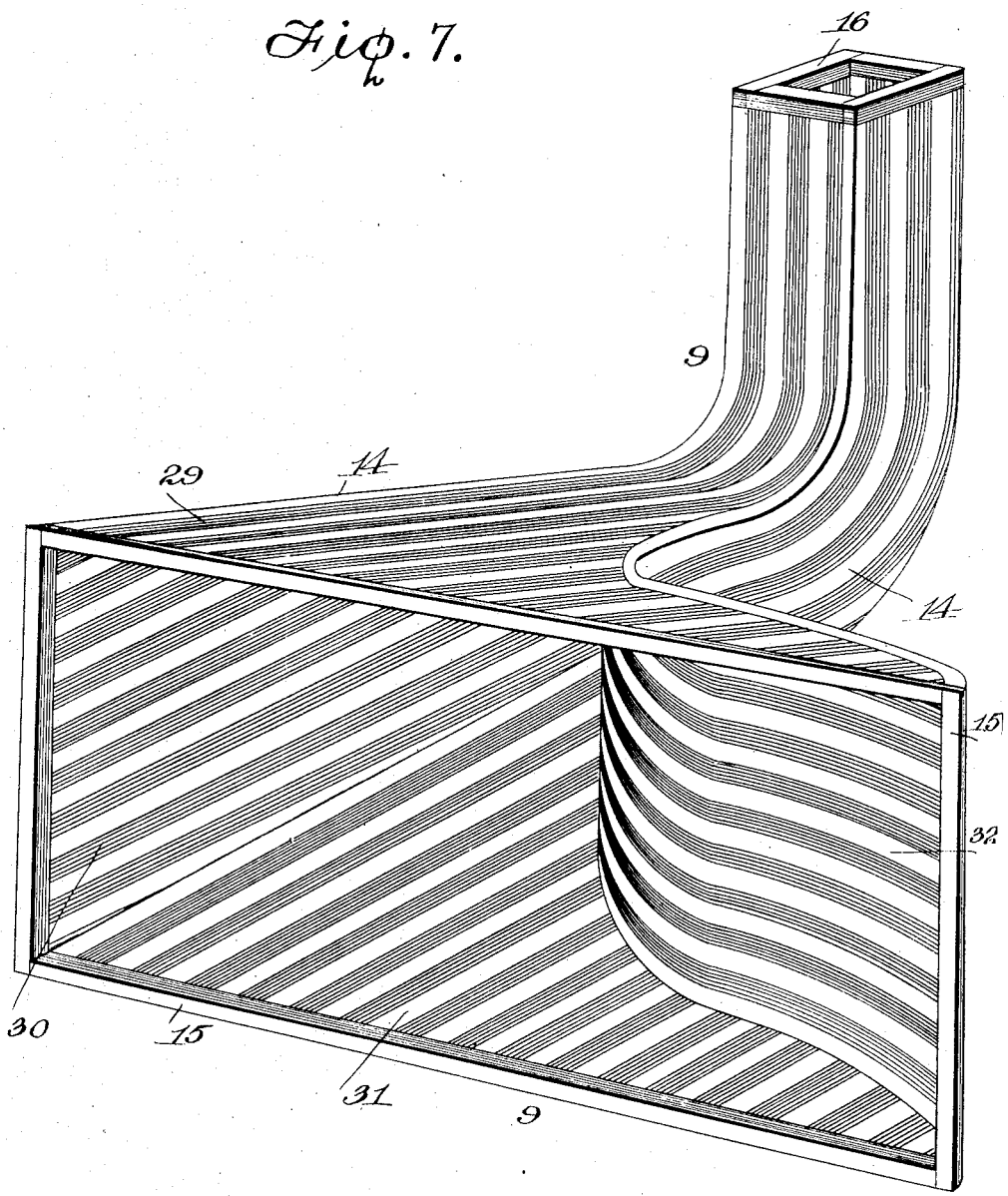

1,387,575.

Patented Aug. 16, 1921.
7 SHEETS—SHEET 5.

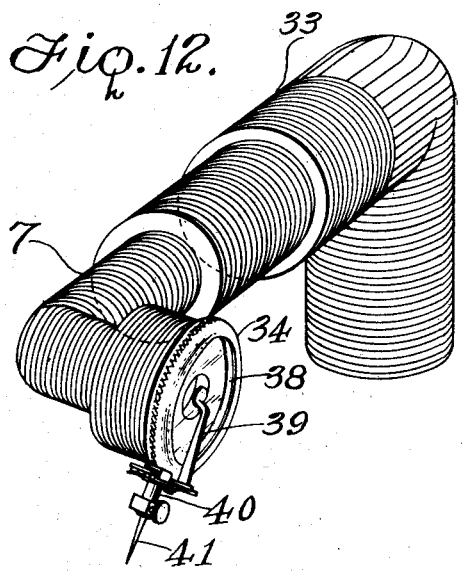
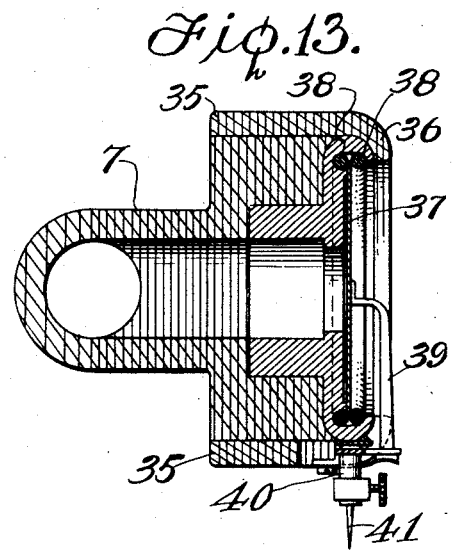
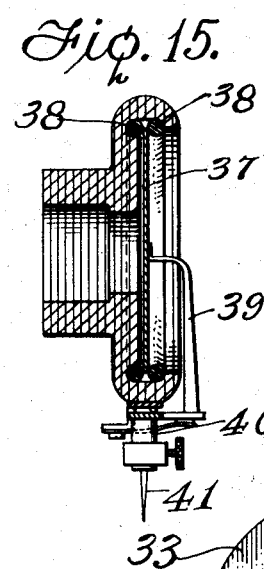
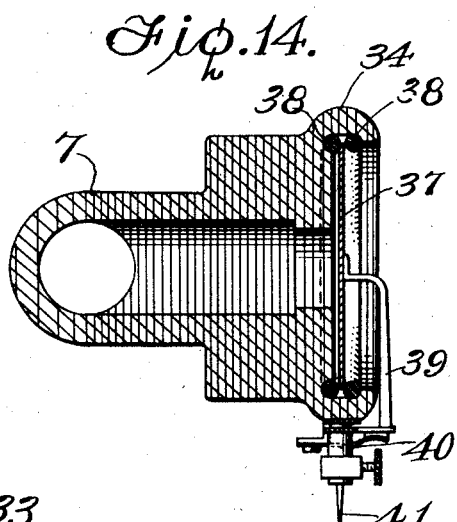
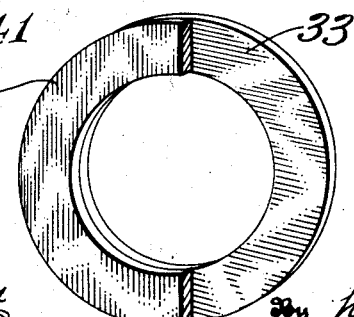

UNITED STATES PATENT OFFICE.

JOSEPH WOLFF, OF BROOKLYN, NEW YORK, ASSIGNOR TO SONORA PHONOGRAPH CORPORATION, A CORPORATION OF NEW YORK.

TALKING-MACHINE.

1,387,575.  Specification of Letters Patent.  Patented Aug. 16, 1921.

Application filed September 1, 1915. Serial No. 48,492.

*To all whom it may concern:*

Be it known that I, JOSEPH WOLFF, a subject of the King of Great Britain and Ireland, and residing at Brooklyn, in the county of Kings, city and State of New York, have invented certain new and useful Improvements in Talking-Machines, of which the following is a specification.

The main objects of this invention are to provide a talking machine with a continuous wooden sound amplifier of relatively great efficiency; to provide an improved sound amplifier constructed entirely of wood, thereby transmitting the sound waves from the sound-box through a continuous wooden passage to the atmosphere thereby increasing the sonority, brilliancy, and other good qualities in sounds; and entirely eliminating the "brassy" or metallic sound so prevalent in talking machines; and giving a most wonderfully clear, brilliant, broad and mellow quality to the reproduction; to provide a wooden tone-arm constructed as hereinafter described, for talking machines; and the object thereof is to provide such a tone-arm of the class specified which will do away with the mechanical, harsh, and metallic sounds produced in the operation of talking machines; and to produce a full, even and continuous volume of sound in which the articulation is clear, full and distinct, a further object being to provide a tone-arm of the class specified which is made entirely of wood or other fibrous material, as hereinafter described; to provide a horn of wood or other fibrous material, constructed as hereinafter described, and to be so constructed that it shall have unexcelled acoustic properties, and to increase the volume and purity of the tone produced.

Another object of my invention is to make the sound boards used in connection with my sound amplifying device resonant in order to cause the same to readily vibrate in sympathy with the air inclosed between the same.

Another object of my invention is to provide improvements in apparatus for reproducing sound; by means of which the quality and naturalness of the recorded sounds are reproduced with greater faithfulness, and to impart resonance to the reproduced sounds.

One of the foregoing objects of my invention, namely, the improvement in the quality and naturalness of the reproduction, and which is accomplished in my apparatus, is due to the peculiar construction of the tone-arm and horn of wood, shown in the different figures of the drawings. I have found in practice, that by constructing the wooden tone-arm and wooden horn, as hereinafter described, improves the quality and naturalness of the reproduced sound, and having secured such new results, I desire to claim broadly an apparatus embodying such means. I have also found, that such tone-arm and horn, constructed as herein specified, acts as a resonator, or, in other words, it provides a combined amplifier and resonator, by which resonance is imparted to the amplified sounds which, of course, is an advantage and a new result.

Another object of the invention is to produce a talking machine having a horn constructed of more than three ply veneering, as for example a horn of nine ply veneering arranged nine ply vertically and nine ply horizontally, and so alternating, produces greater sonority, brilliancy and qualities in the reproduced sound.

A further object of the invention is to produce a talking machine having a tone-arm constructed of wood, as for example a tone-arm of construction substantially the same as the horn herein above mentioned, thereby providing the talking machine with a continuous passage constructed entirely of wood, thereby securing the greatest possible results, efficiency and perfection obtainable in reproduction in a talking machine.

A further object is to so construct the tone-arm, as to prevent the escape of any sound, and to eliminate any packing at the point of contact with the horn.

A further object of my invention is to further improve the quality of the reproduced tone by the use of an improved sound-box, one preferably composed of wood or other fibrous material, to the end that the sound waves set up by the vibrations of the diaphragm will in their passage from the diaphragm to the outlet of the horn or diffuser, be conveyed through a continuous passage, the sides of which are constructed of wood or fibrous material.

Another object of the invention is to so improve and construct the sound-box that the resonance and quality of the reproduced sound will be increased and intensified.

These and further objects will more fully appear in the following specification and accompanying drawings considered together or separately.

My invention is illustrated in the drawings, and described in the specification, in which corresponding parts in all the figures are designated by similar reference characters.

In the drawings,—

Figure 1 is a side elevation, partly in section, of a talking machine cabinet having a talking machine provided with a wooden sound amplifier, and other details constructed in accordance with this invention;

Fig. 2 is a perspective view of a wooden tone-arm constructed in accordance with one embodiment of this invention;

Fig. 3 is a view of the tone-arm, partly in section, taken on the line 3—3 of Fig. 2;

Fig. 4 is a perspective view of the preferred embodiment of the horn construction;

Fig. 5 is a fragmentary sectional view showing the construction of the veneering of embodiment of Fig. 4;

Fig. 6 is a modified form of the horn construction;

Fig. 7 is another modified form of the horn construction;

Fig. 12 is a perspective view of another modification of my improved tone-arm;

Fig. 13 is a sectional view of a tone-arm and sound-box;

Fig. 14 is another modification of my combined tone-arm and sound-box construction;

Fig. 15 is a sectional view of my improved sound-box;

Fig. 16 is a view showing the arrangement of the veneerings in Fig. 12.

Figure 8:
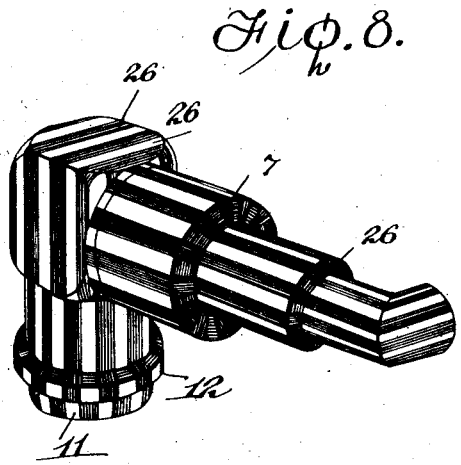
Figs. 8 and 9 illustrate perspective views of a tone-arm constructed of a plurality of veneers or veneered material.

Referring to the drawings, one embodiment of this invention comprises a cabinet 1, the same being provided with a hinged cover 2, to shield the talking machine. The cabinet has a horizontal partition 3, said partition being constructed with openings therein directly over the motor casing, and likewise provided with scroll work; from said partition depends a motor 4, for actuating the turn-table 5, arranged above the partition 3. Above the turn-table, a sound-box 6 is carried by and communicates with the free smaller end of a hollow wooden tone-arm 7, constructed in accordance with this invention, the larger end of which is turned downwardly and telescopes rotatively in a bushing 8, extending through and fitting snugly the partition 3, said bushing being supported by and snugly fitting the small end of the horn 9. On top of the bushing 8 is a wooden plate 10, which is secured to the partition 3, and fits tightly around the periphery of the tone-arm 7, and holds the same securely in position.

The wooden tone-arm 7 is provided at its larger end with a wedge shaped projection 11, and a shoulder 12; this wedge shaped projection 11 sets snugly in a recess in the bushing 8, thereby making a tight joint and preventing the escape of any sound waves, and eliminating any packing. The shoulder 12 is constructed of such dimensions that the top of the shoulder will not rest against the plate 10, but be free from said plate, thereby providing the opening 13; the same permits the raising of the tone-arm when required.

For amplifying the sounds reproduced by the talking machine, there is provided an improved sound amplifier or resonator constructed in accordance with this invention. This amplifier or resonator includes a tone-arm 7, constructed as hereinafter described, fitting snugly in the opening of a bushing 8, and a horn 9, constructed as hereinafter described, likewise fitting snugly the opening in the lower side of the bushing 8, thereby providing a continuous passage for the sound waves. The sound amplifier or resonator being constructed entirely of wood, as hereinafter described, eliminates all sharp, harsh, hollow, brassy, metallic or other unpleasant qualities from the sound transmitted, increases the volume and gives a clear, brilliant, broad and mellow quality to the reproduced sounds.

I will now describe the construction of the preferred embodiment of my improved horn as illustrated in Figs. 1 and 4.

To give great resonant quality to the horn, I construct the same in the manner indicated in Figs. 1, 4 and 5, that is to say, I provide a number of suitably shaped single layers of veneering or very thin strips of wood, the same being arranged transversely to the length of the resonator; I arrange a plurality of plies of very thin strips of wood or veneerings 14, side by side, the said strips of veneerings being glued together; then I arrange a plurality of very thin strips of wood or veneerings in a position at right angles to the first set of strips, the same being likewise glued together, and to the first set of strips, and I so alternate the construction for the entire length of the horn. I apply this construction to all four sides of the amplifier. I have shown in Fig. 5, the construction employed. It will be noticed that the strips are arranged so that some extend the full thickness of the walls and others do not, but are superposed to form the full thickness. I have found that a sound amplifier constructed and arranged in this manner, produces a most brilliant reproduction of the sound, and with wonderful volume, not heretofore obtainable.

In Fig. 6, I have shown another embodiment of my invention, constructed in all substantial respects the same as the amplifier disclosed in Figs. 1, 4 and 5, except that the various layers of veneerings or strips of thin wood run longitudinally with the length of the resonator.

In Fig. 7, I have shown a further embodiment of the invention, constructed like Fig. 6, except that I have added a capping 15 to the four sides of the large end of the amplifier, and likewise a capping 16 to the four sides of the neck or small end of the amplifier. The capping is composed of thin strips of wood or other fibrous material cemented together and arranged across the ends of the strips comprising the horn, and are preferably arranged perpendicular to all of the strips comprising the horn proper.

Figure 10:
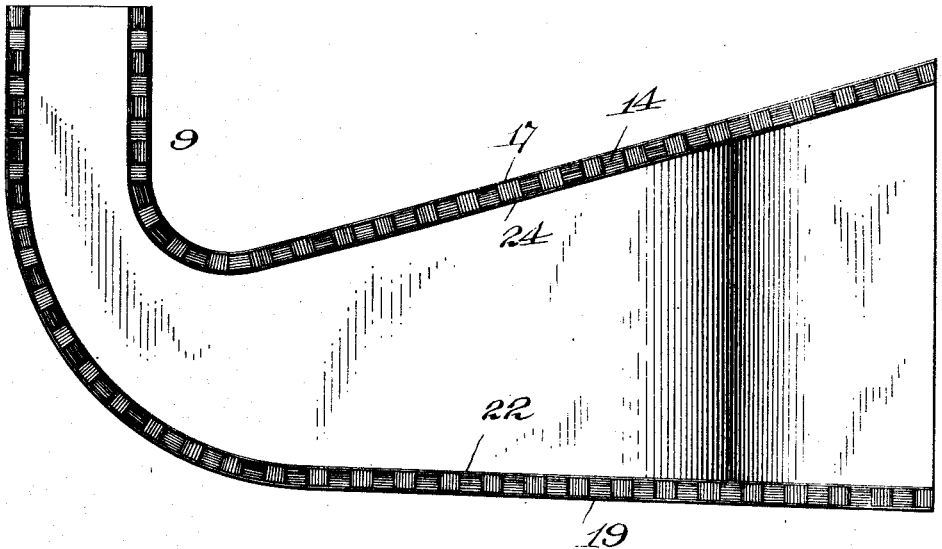
Fig. 10 is a further modification of the horn construction.
Figure 11:
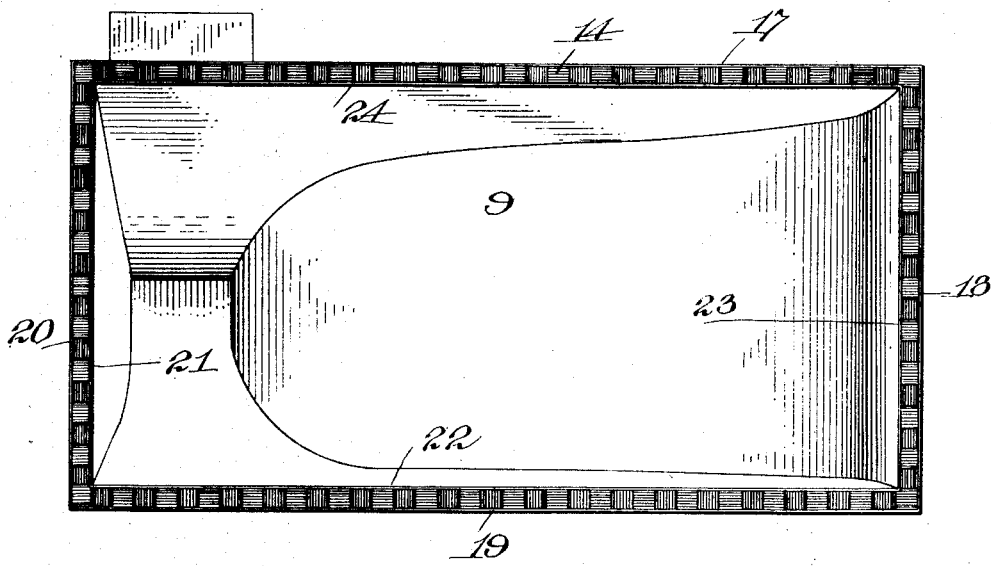
Fig. 11 is a front view of the modification illustrated in Fig. 10.

In the embodiment shown in Figs. 10 and 11, the amplifier is constructed substantially like that shown in Figs. 1, 4, 5, 6 and 7, except that it is provided with thin strips of wood or veneerings 17, 18, 19 and 20, which cover the entire outside of the horn; likewise on the inside of the horn there are provided thin strips of wood or veneerings 21, 22, 23 and 24, which run the entire length of the horn, and cover the interior thereof. This construction gives added strength to the resonator, and produces great efficiency and tone reproduction.

In Fig. 12, I have shown a further embodiment of my invention; the same illustrating a tone-arm 7 constructed of a plurality of veneerings or strips of thin wood 33. These veneerings or strips of thin wood are arranged so that in each alternative veneering or strip of wood, the grain is in opposite direction. As part of said tone-arm construction, I have secured thereto a sound-box 34.

In the embodiment shown in Fig. 13, there is a tone-arm 7 made up of a plurality of veneerings or strips of thin wood, provided with a capping of veneering or strips of wood 35, the same having an overlapping edge 36 for retaining in place a complete sound-box. I have found that a construction of this character gives improved results.

In Fig. 14 I have illustrated one embodiment of my invention, which comprises a tone-arm 7, and a sound-box 34 constructed entirely of wood or other fibrous material. As to this part of my invention, I do not limit myself to veneerings or thin strips of wood, but claim broadly a combined wooden tone-arm and wooden sound-box. The said wooden sound-box is provided with a diaphragm 37 secured between two rubber gaskets 38, 38, said diaphragm having attached thereto a bar 39 to which is pivoted a stylus holder 40, the said stylus holder retaining in place the stylus point 41.

In Fig. 15, I have shown a wooden sound-box constructed in accordance with one embodiment of my invention. This wooden sound-box may be constructed of a solid piece of wood or a plurality of strips or veneering or thin strips of wood, or may be made of fibrous material. I do not limit myself to any particular construction, but I claim broadly a wooden sound-box. I have found in practice that a construction of this character, used in conjunction with my improved tone-arm and amplifier, produces great efficiency and tone production.

It will be understood that the constructions shown in Figs. 7, 10 and 11, may be used in the same structure without departing from the spirit or scope of my invention.

It will also be understood that instead of being of circular cross section, the tone-arm may be of any desired shape, and the horn, instead of being rectangular cross section, may be of any other shape.

My tone-arm construction is not limited to playing of a lateral record, but the same may be so constructed as to play either the lateral or the vertical cut record.

I construct my improved tone-arm as follows:

The construction shown in Figs. 1, 2 and 3, is built up of a plurality of veneerings or strips of thin wood 25, glued together. I have found that a construction of this character gives pleasing resonator qualities, and eliminates the brassy or metallic sounds in part produced by the tone-arm heretofore used.

In Fig. 8 I have illustrated one embodiment of a tone-arm construction, in which the tone-arm is made substantially like the amplifier shown in Fig. 6, that is, it is made up of a plurality of veneerings or thin strips of wood 26, arranged longitudinally of the length of the tone-arm, the same being built of a plurality of plies, arranged flat or horizontally, then of a plurality of plies vertical, and so alternating, as plainly shown in said figure.

Figure 9:
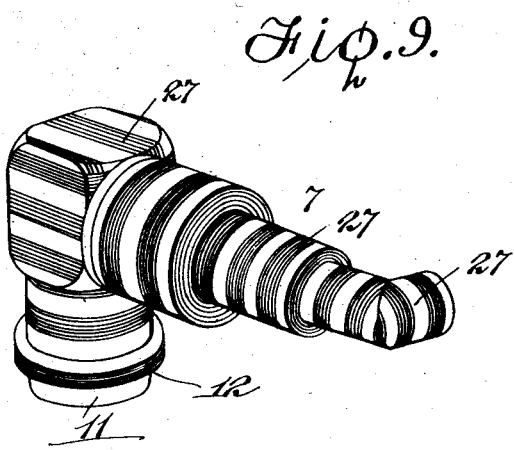

In the embodiment illustrated in Fig. 9, I show a tone-arm constructed in all substantial respects the same as the preferred embodiment of the amplifier illustrated in Figs. 1, 4 and 5. This tone-arm is constructed of a plurality of thin strips of wood or veneerings, arranged transversely to the length of the tone-arm, the same being made of a plurality of strips of wood or veneerings 27, arranged horizontally or flat, and of a plurality of strips of wood or veneerings 27, arranged vertically, and so alternating throughout the length of the tone-arm, as plainly shown in said figure.

It is of course understood that my invention is not limited either as to the tone-arm or horn, to wood constructed of thin strips or veneerings, but the same may be made of any fibrous material.

The operation of the device is as follows:

The sound-waves set up by the vibrations of the diaphragm of the sound-box 6 caused by the rotating of the turn-table 5, upon which is a record 28, are transmitted through the wooden sound conveyer 7, and out and between the thin resonant sounding boards 29, 30, 31 and 32, of Figs. 1, 4, 6 and 7, and of the sounding boards 21, 22, 23 and 24, of Figs. 10 and 11, of my improved sound amplifier or resonator,—these boards being set into sympathetic vibrations with and by the waves, being conducted therethrough and by the vibration of these sound-boards, the sound corresponding to the vibrations being reproduced, are greatly augmented and amplified, thus making it possible to convey the sound from the sound-box to a resonating tone-arm and a resonating amplifier, without any loss of energy, and to produce the reproduction which will be full, clear and exact, and have no brassy or metallic sounds therein, this being due to the peculiar construction of the tone-arm and horn, as hereinbefore described.

It is understood, of course, that my invention is not limited to the particular form of apparatus herein shown and described. I claim broadly the right to employ all equivalent instrumentalities coming within the scope of the claims, and by means of which objects of my invention are attained, and the new results accomplished, as herein set forth, as it is obvious that the particular embodiments herein shown and described are only some of many that can be employed to attain these objects and accomplish these results, and that the invention may be carried out in other ways without departing from the spirit of my invention.

Having now described my invention, what I claim as new and desire to secure by Letters Patent of the United States, is:

1. A sound conveying device for talking machines, defined by walls comprising a plurality of sections secured together side by side, each section consisting of a plurality of narrow strips, the strips of adjoining sections being arranged at different angles.

2. A sound conveyer whose walls are made of strips or sections each section consisting of a plurality of laminations and the sections placed side by side so that the planes of the laminations of adjacent sections intersect.

3. A sound conveyer for talking machines defined by walls of laminated material, the thickness of certain portions of the wall being composed of a single lamination and other portions being made up of a plurality of laminations.

4. A sound conveyer defined by walls of laminated material, each lamination having at least two of its three dimensions no greater than the depth or thickness of the walls.

5. A sound conveyer made up of sections of laminated material, each lamination having at least two of its dimensions no greater than the depth or thickness of the walls of the sound conveyer.

This specification signed and witnessed this 10th day of August, 1915.

JOSEPH WOLFF.

Witnesses:
HERBERT W. WEISE,
WILLIAM F. VARIN.